No. 667,911. Patented Feb. 12, 1901.
W. A. HATCHER.
MOTOR VEHICLE.
(Application filed Jan. 16, 1900. Renewed Jan. 15, 1901.)
(No Model.) 5 Sheets—Sheet 2.
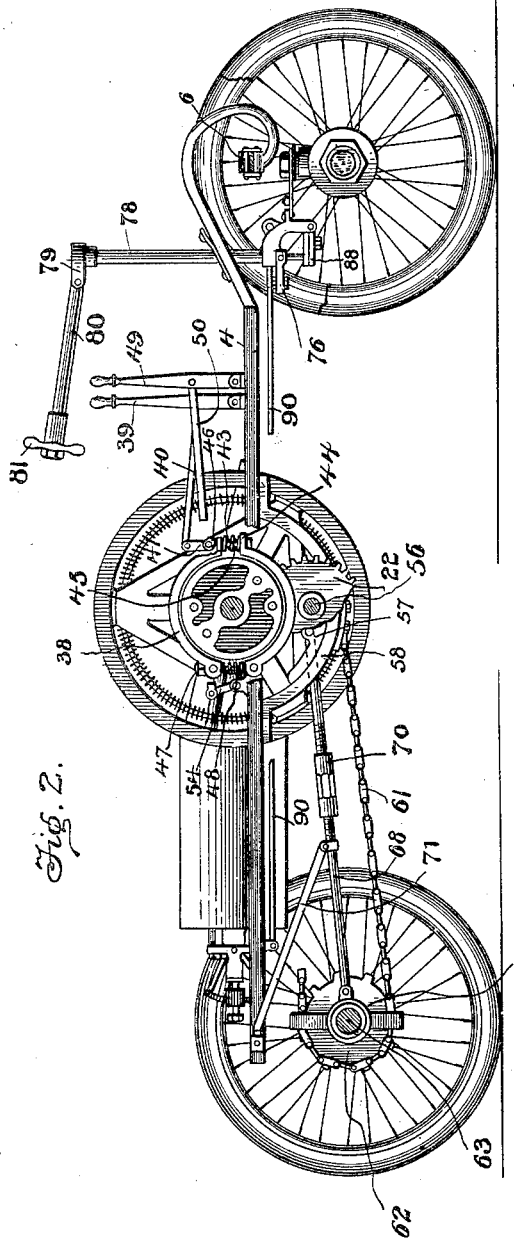
Witnesses
Fenton S. Belt,
E. M. Olmsted
Inventor
W. A. Hatcher
By Watson & Watson
Attorneys No. 667,911. Patented Feb. 12, 1901.
W. A. HATCHER.
MOTOR VEHICLE.
(Application filed Jan. 16, 1900. Renewed Jan. 15, 1901.)
(No Model.) 5 Sheets—Sheet 3.
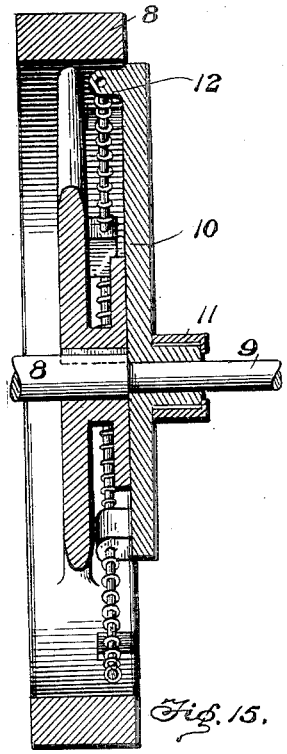
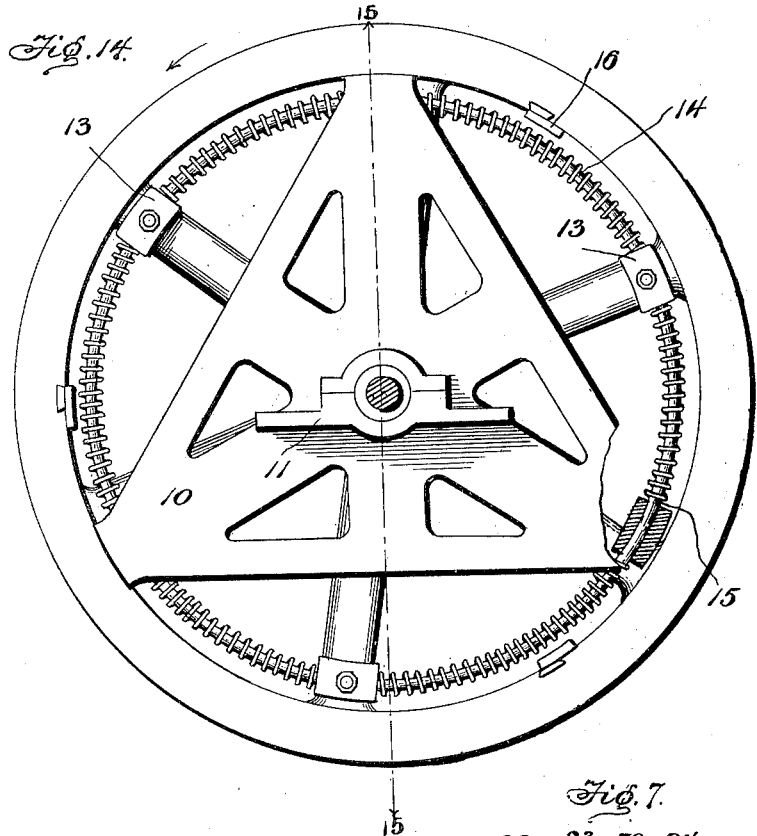
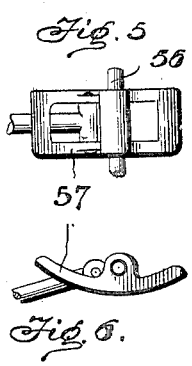
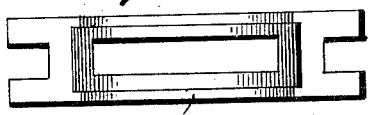
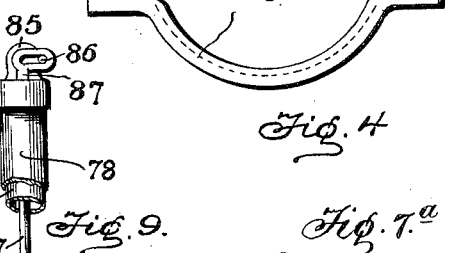
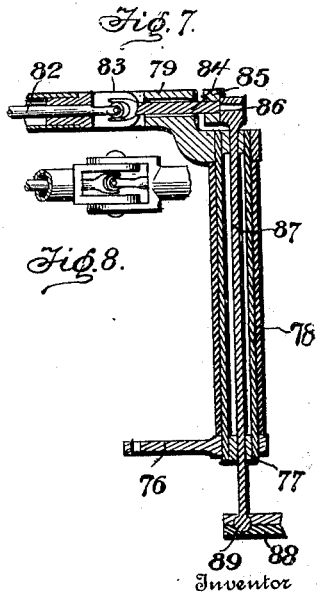
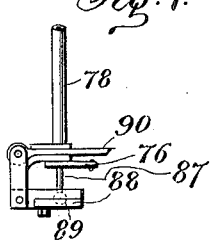
Witnesses
Fenton S. Belt,
E. M. Olmsted
Inventor
W. A. Hatcher
By Watson & Watson
Attorneys
THE NORRIS PETERS CO., PHOTO-LITHO., WASHINGTON, D. C.

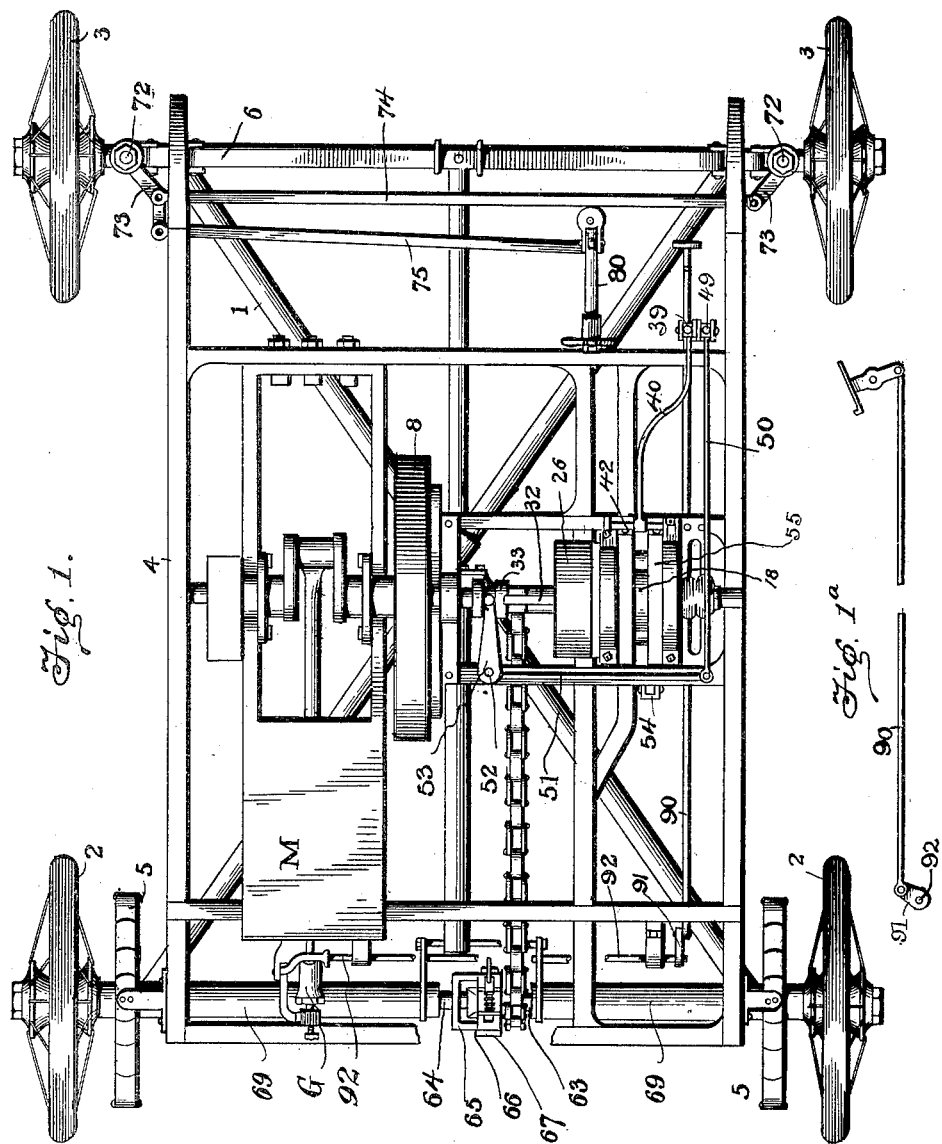

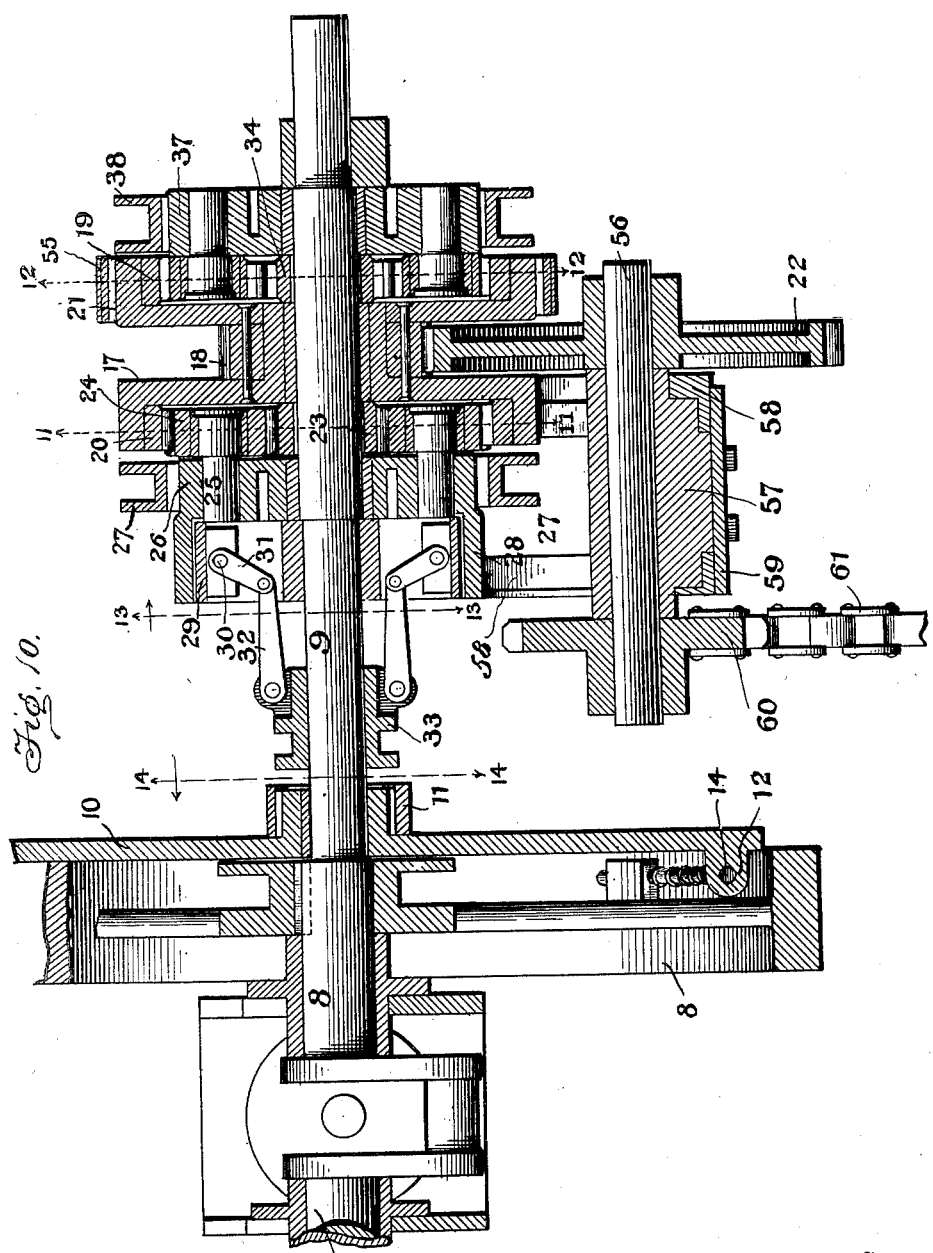

No. 667,911. Patented Feb. 12, 1901.
W. A. HATCHER.
MOTOR VEHICLE.
(Application filed Jan. 16, 1900. Renewed Jan. 15, 1901.)
(No Model.) 5 Sheets—Sheet 5.
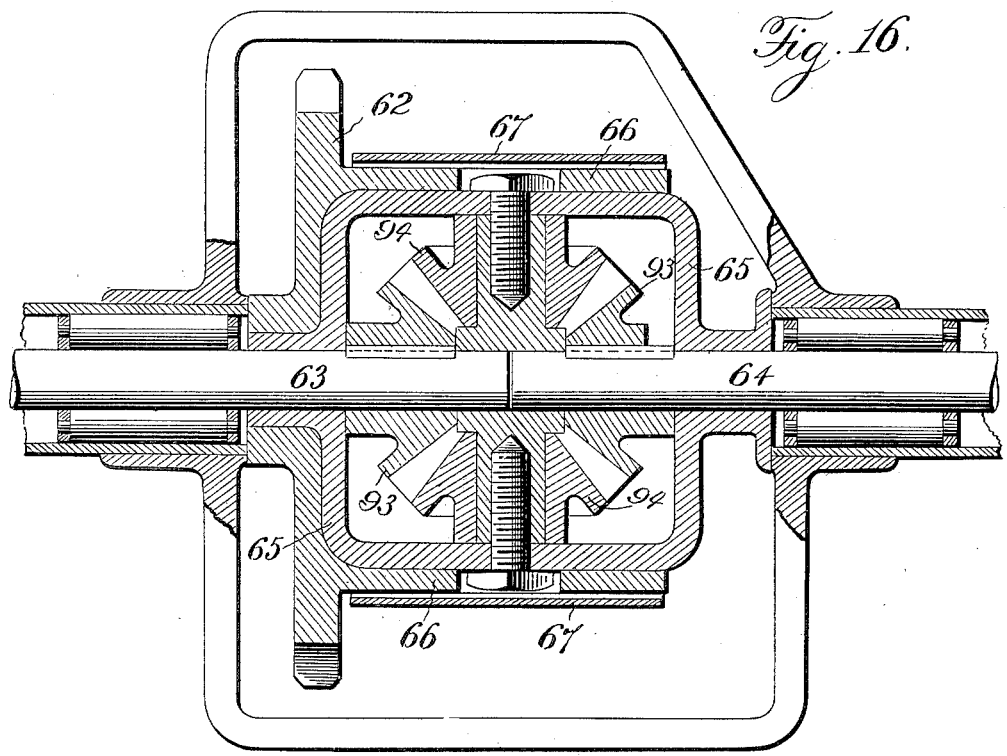
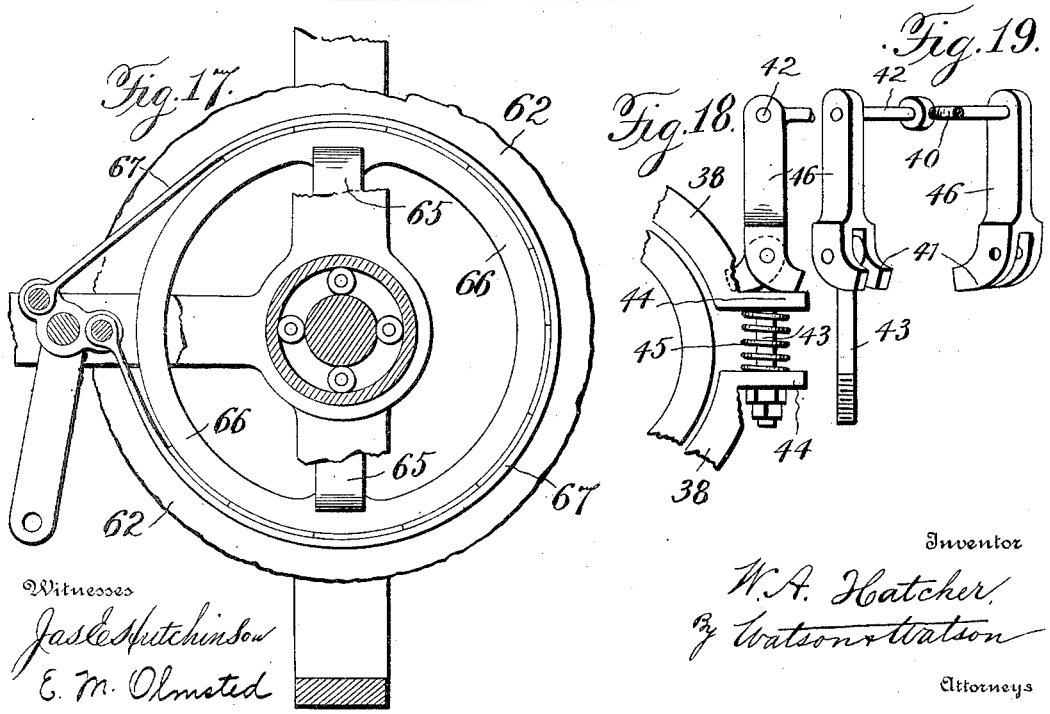

UNITED STATES PATENT OFFICE.

WILLIAM A. HATCHER, OF WARREN, OHIO, ASSIGNOR TO JAMES W. PACKARD, OF SAME PLACE.

MOTOR-VEHICLE.

SPECIFICATION forming part of Letters Patent No. 667,911, dated February 12, 1901.

Application filed January 16, 1900. Renewed January 15, 1901. Serial No. 43,390. (No model.)

*To all whom it may concern:*

Be it known that I, WILLIAM A. HATCHER, a citizen of the United States, residing at Warren, in the county of Trumbull and State of Ohio, have invented certain new and useful Improvements in Motor-Vehicles, of which the following is a specification.

My invention comprises various improvements in motor-vehicles, and more particularly in the devices for changing speed, reversing, braking, and otherwise controlling the speed and movement of the vehicle.

The invention will be particularly described in connection with the accompanying drawings, in which—

Figure 1 is a plan view of so much of a motor-vehicle as is necessary to illustrate the present invention. Fig. 1$^a$ is a detail of Fig. 1. Fig. 2 is a side elevation, partly in section. Figs. 3 to 9, inclusive, and Fig. 7$^a$ illustrate various details. Fig. 10 is a section through the main shaft and counter-shafts, illustrating the details of the speed-changing mechanism. Figs. 11, 12, 13, and 14 are sections on the lines 11, 12, 13, and 14, respectively, of Fig. 10. Fig. 15 is a section on the line 15, Fig. 14. Fig. 16 is a sectional view of the rear sprocket and equalizing-gears. Fig. 17 is a side view of the brake wheel and band, and Figs. 18 and 19 are details of the reversing-gear.

Referring to the drawings, 1 indicates the frame of the running-gear; 2, the driving-wheels; 3, the steering-wheels, and 4 the frame carrying the motor mechanism, said frame being supported at the front and rear upon suitable springs 6 5.

The power-shaft 7 is driven by a suitable motor M, preferably a hydrocarbon-engine. Upon one end of the power-shaft is a fly-wheel 8, and in line with the power-shaft is a counter-shaft 9, the ends of said shafts being close together. Referring to Figs. 10, 14, and 15, 10 indicates a frame or spider which is fast upon counter-shaft 9. The shaft and frame are supported, as shown, by the bearing 11. The spider 10 has a series of lugs 12, which are integral with and in the same circle with lugs 13 upon the fly-wheel 8. Through the lugs 12 and 13 passes a circular rod 14, surrounded by spiral springs 15, which springs keep the lugs 12 centrally located between lugs 13. The arrangement of lugs and springs forms a yielding connection between the motor and the driving-wheels, which prevents strains in the machinery due to suddenly starting the motor or applying the brakes and also due to inequalities in the roadway. To prevent undue strain upon the springs 15, the fly-wheel is also provided with intermediate fixed lugs 16, against which the lugs 12 abut when there is an extreme strain upon the motor.

Turning freely on the counter-shaft 9 is a part 17, which is provided with a power-transmitting gear 18, two internal gears 19 and 20, and a braking-surface 21, all of which parts are either integral or securely fastened together. The driving-gear 18 intermeshes with a gear 22, from which power is transmitted to the driving-wheels through devices which will be hereinafter described.

A slow backward movement is imparted to the driving-gear by means of a gear 23, Figs. 10 and 11, which is keyed upon the shaft, and intermediate gears 24, which mesh with the gears 23 and 20. The gears 24 are carried upon the studs 25 upon disk 26, which is free to revolve upon the shaft 9. Surrounding the disk 26 are brake-shoes 27, which may be applied to stop the rotation of said disk, as will be hereinafter described. When the disk 26 is stopped, power is positively transmitted from the gear 23 through the gears 24 and 20 to the gears 18 and 22, giving the vehicle a backward movement.

Integral with the disk 26 is a flange 28, within which are shoes 29 of an expanding clutch, Fig. 13. As shown, the clutch-shoes 29 are expanded by means of screws 30, arms 31, links 32, sliding collar 33, and means for moving the collar, which will be referred to hereinafter. When the clutch-shoes 29 are rendered operative, the disk 26 and its pinions are carried around positively with the shaft 9 and the pinions 24 lock the gear 23 to the internal gear 20. The driving-gear 18 is thus rotated with the speed of the driving-shaft 7 and the counter-shaft 9, giving the vehicle a high speed forward.

A low speed forward is given to the vehicle by means of a gear 34, fixed on the shaft 9, and two pairs of intermediate gears 35, Figs. 10 and 12, mounted on studs 36, which are carried by a disk 37, loose upon the shaft 9. The disk 37 may be held stationary by brake-shoes 38 and when so held the integral gear 19 and the driving-gear 18 will be slowly rotated forward, thus cutting down the speed and increasing pull upon the driving-wheels for the purpose of climbing hills and overcoming other resistances.

It will be noted that the speed changing and reversing devices just described are simple in construction and arranged in an exceedingly compact and effective manner. It will also be noticed that under normal conditions—that is, when the machine is running full speed ahead—the gearing between the shaft 9 and the driving-gear 18 is eliminated, the parts being all rigidly connected together and the friction and wear of machinery reduced to a minimum.

The brake shoes or bands 27 and 38 are operated by a hand-lever 39, connecting-rod 40, rod 42, connecting cam-levers 46, and cams 41 on said levers, Figs. 1, 2, 18, and 19. The cam-levers are pivoted to the upper ends of rods 43, which connect lugs 44 upon the shoes 27 and 38. The lugs 44 are pressed apart by springs 45, and thereby the shoes are normally held away from the disks. The brake-shoes are applied to the disks by means of the cams 41, which are oppositely disposed and arranged, so that when the lever 39 is moved forward the shoes 38 are applied and the slow forward movement is given to the vehicle, and when the lever 39 is moved backward the shoes 27 are applied and a slow backward movement is given. In the middle position of the lever the shoes 27 and 38 are free from their disks and the motor is disconnected from the vehicle unless the high-speed clutch is applied. The rear ends of the brake-shoes 27 and 38 are adjustably connected by bolts 47. (See Fig. 2.) They are normally held apart by springs 48 and they may be drawn together to take up wear by suitable nuts on the bolts 47.

The high-speed clutch is operated by a lever 49, link or rod 50, arm 51, rock-shaft 52, and arm 53, the latter arm engaging the clutch-collar 33. The forward movement of the lever 49 applies the clutch-shoes 29 and imparts a high forward speed to the vehicle. A rearward movement of the lever 49 operates through lever 51 and connecting-arm 54, Figs. 1 and 2, to apply a brake-band 55 to the brake-surface 21 of the gear-piece 17. This forms an efficient brake for the vehicle, the gear-piece 17 being connected with the driving-wheels, as will now be described. Below the counter-shaft 9 is a swing-shaft 56, carried by a bearing 57, which slides in semicircular guides 58, Figs. 2, 3, 4, and 10. Bearing-block 57 is suitably held in the guides 58 by a cap-plate 59. The semicircular guides 58 are attached rigidly to the frame which carries the shaft 9 and conform to the arc of a circle which is concentric with said shaft. The shaft 56 is therefore always at the same distance from the shaft 9, and gears 18 and 22 intermesh properly in any position of the bearing-block 57. On one end of the shaft 56 is a sprocket-wheel 60, from which power is communicated to the driving-wheels through chain 61 and sprocket-wheel 62. The rear axle is in two independent parts 63 64, one of the driving-wheels being connected to each part. The inner ends of the axle-sections are provided with bevel-gears 93, and a rotating box or frame 65 carries equalizing bevel-gears 94, which intermesh with the bevel-gears on the axle. The box 65 also carries the rear sprocket-wheel 62 and a braking-surface 66, with which a brake-band 67 coöperates, thus affording an additional means of stopping or retarding the carriage, Figs. 1 and 16.

For the purpose of maintaining a constant relation between the sprocket-wheels 60 and 62 the bearing-block 57 is connected with the rear axle by a brace 68. As shown, this brace is pivotally connected with one end of the block 57 and at the other end with the rear tube 69 of the frame, the axle 63 running in suitable bearings in said tube. The brace 68 is formed in two parts, having right and left threaded ends united by a turnbuckle 70, by means of which the tightness of the chain 61 can be adjusted. To prevent the upper frame 4, which carries the motor and counter-shaft from vibrating longitudinally with relation to the lower frame 1, which carries the axles, the brace 68 is connected with said upper frame by a link 71, Fig. 2. The point of connection of the link 71 with the brace 68 is so arranged that the upper frame 4 can have no longitudinal movement relatively to the lower frame, and the gear 18 is therefore prevented from "climbing" on the gear 22. The upper frame 4 is free to vibrate vertically on its supporting-springs.

The axles of the steering-wheels 3 turn about vertical shafts 72 in the usual manner, said axles being provided with arms 73, which are connected by a link 74. A second link 75 connects one of the arms with an arm 76, rigid upon a tubular shaft 77, arranged within a tubular standard 78 upon the front portion of the vehicle-body. To the upper end of the shaft 77 is rigidly connected an arm 79, to which the steering-lever 80 is joined by a hinge-joint, which permits it to move in a vertical plane.

To provide a convenient means of controlling the speed of the motor, I connect the governing devices G of the motor with a rotary knob or handle 81 on the end of the steering-lever 80. The connections comprise a shaft 82 within the lever 80, a universal joint 83 at the point where the lever 80 joins the arm 79, a rotating shaft 84 within the arm 79, a crank 85 and crank-pin 86 on the end of said shaft, a rod 87, reciprocating within the hollow shaft 77, and an elbow-lever 88, to which the rod 87 is connected by a ball-and-socket joint 89. The elbow-lever 88 is connected by a link 90 to the arm 91 on a shaft 92, running across the rear end of the machine to the governing devices G. These governing devices comprise means for regulating the supply of explosive mixture to the engine. If another form of motor is used, they would of course be adapted to it. The particular governing devices are illustrated and described in detail in a separate application for Letters Patent filed by me of even date herewith, and it is thought that a detailed description of them is not necessary in this case.

In Figs. 1 and 1ᵃ I have shown the rod 90 with connections to the governing devices as being operated by a foot-lever instead of by the handle 81. In some instances I may use the foot-lever in place of the handle.

It will be evident that various changes in construction and arrangement may be made without departing from the spirit and scope of my invention. Therefore I do not limit myself to the exact details illustrated and described.

What I claim is—

1. In a motor-vehicle, the combination with a motor and its shaft, of a counter-shaft in line with the motor-shaft, a frame secured to said counter-shaft, a balance-wheel mounted on the motor-shaft and having a circular flange surrounding the frame on the counter-shaft, curved rods connecting lugs on said balance-wheel with the frame on the counter-shaft, coiled springs surrounding said rods and each extending from said frame to one of said lugs, and stops secured to the balance-wheel flange and projecting radially into the path of the frame of the counter-shaft, whereby excessive compression of the springs is prevented.

2. In a motor-vehicle, the combination with the motor-shaft, the balance-wheel on said shaft, lugs on said wheel, curved rods connecting said lugs, spiral springs surrounding said rods, and fixed stops on said wheel intermediate said lugs, of a counter-shaft in line with the motor-shaft, a frame fixed on said counter-shaft, and lugs on said frame through which said curved rods pass and upon which said springs bear, said lugs being adapted to abut against the fixed stops when the springs are overloaded, for the purpose set forth.

3. In a motor-vehicle, the combination of a shaft, the gear-piece 17 loose on said shaft and provided with the driving-gear 18 and the internal gears 19, 20, gears 23 and 34 fixed on said shaft in the planes of the internal gears, and disks 26 and 37 loose on said shaft and arranged on opposite sides of the gear-piece, said disks carrying pinions adapted to connect the gears 23 and 34 with the internal gears, and means for stopping said disks, for the purpose set forth.

4. In a motor-vehicle, the combination of a shaft, a gear-piece loose on said shaft and provided with a drive-gear 18 and an internal gear 20, a gear 23 fixed on said shaft in the plane of the internal gear, a disk 26 adjacent to said internal gear and carrying pinions which intermesh with the internal gear and the gear 23, a brake for stopping said disk, and a clutch for locking said disk to the shaft, for the purpose set forth.

5. In a motor-vehicle, the combination with a shaft and a gear-piece loose on said shaft and provided with a drive-gear and an internal gear, of a gear 23 fixed on the shaft in the plane of the internal gear, a disk adjacent thereto and carrying pinions which intermesh with said gears, said disk being normally loose on the shaft, a brake for stopping said disk, a flange carried by said disk, an expanding clutch within the flange adapted to connect the flange rigidly with the shaft, and means for operating the clutch, for the purpose set forth.

6. In a motor-vehicle, the combination with a shaft, means for driving said shaft, a gear-piece 17 loose on the shaft and provided with a driving-gear, and with two transmitting-gears, 19, 20, arranged on opposite sides of the driving-gear, gears 23, 34 secured to the shaft in the planes of said transmitting-gears, disks loose on the shaft and carrying pinions adapted to connect the gears 23, 34 with said transmitting-gears of the gear-piece 17, and means for locking either of said disks against rotation.

7. In a motor-vehicle, the combination of a shaft, a gear-piece loose on said shaft and provided with a central driving-gear 18, and two transmitting-gears 19, 20, of greater diameter than the driving-gear and arranged on opposite sides thereof, gears 23, 34, fast on the shaft in the planes of said transmitting-gears, disks mounted loosely on the shaft on opposite sides of the gear-piece 17 and carrying pinions adapted to respectively connect the gears 23, 34 with the transmitting-gears 20, 19, and independent means for preventing rotation of either of said disks.

8. In a motor-vehicle, the combination with the supporting-frame, the power-shaft, the direct driving-gear and reverse-gear, and the drive-gear mounted on said shaft, of a guide stationarily secured to the frame and extending concentric with said shaft, a swing-shaft having its bearing mounted to slide on said guide, a gear on said shaft meshing with the drive-gear, and a sprocket-wheel on said shaft, for the purpose set forth.

9. In a motor-vehicle, the combination with the shaft, the drive-gear mounted on said shaft, and the curved guides concentric with said shaft, of a bearing mounted to slide on said guides, a shaft in said bearing provided with a gear which is in mesh with the drive-gear, a sprocket-wheel on said latter shaft, a sprocket-wheel on the rear axle, a chain connecting said sprocket-wheels, and an adjustable rod extending between said bearing and the rear axle whereby the tightness of the chain and the relative positions of said rear axle and said bearing may be adjusted.

10. In a motor-vehicle, the combination with the running-gear frame, the springs upon said frame, and the motor-frame supported on said springs, of the brace 68 and the link 71 connecting said frames whereby relative lateral movement is prevented without preventing relative vertical movement between the frames.

11. In a motor-vehicle, the combination of the rear axle, and a sprocket-wheel thereon, of a motor-frame supported upon said axle by intermediate springs, a sprocket-wheel supported by the motor-frame, a brace between the rear axle and the last-named sprocket-wheel, and a link connecting said brace with said motor-frame, for the purpose set forth.

12. In a motor-vehicle, the combination with direct and reverse gearing, of clamps for bringing said gearing into action, cams operating the clamps of the direct and reverse gearing alternately, an operating-lever, and a connection between said lever and said cams.

13. In a motor-vehicle, the combination of a shaft, a gear-piece loose on said shaft and provided with a driving-gear and an internal transmitting-gear, a gear fixed on the shaft in the plane of said internal gear, a disk loosely mounted on the shaft adjacent to said internal gear and carrying pinions which intermesh with the internal gear and the fixed gear, a brake-band surrounding said disk and having its ends projecting radially therefrom, a bolt connecting the ends of the brake-band, a spring surrounding said bolt and acting to normally hold the ends of the brake-band apart, a cam, and an operating-lever arranged to move said cam against one end of the brake-band to force said band upon the disk and prevent rotation thereof.

In testimony whereof I affix my signature in presence of two witnesses.

WILLIAM A. HATCHER.

Witnesses:
J. W. PACKARD,
ROBT. E. GORTON.